(No Model.)
S. HALEY.
TWO WHEELED VEHICLE.
No. 263,511. Patented Aug. 29, 1882.
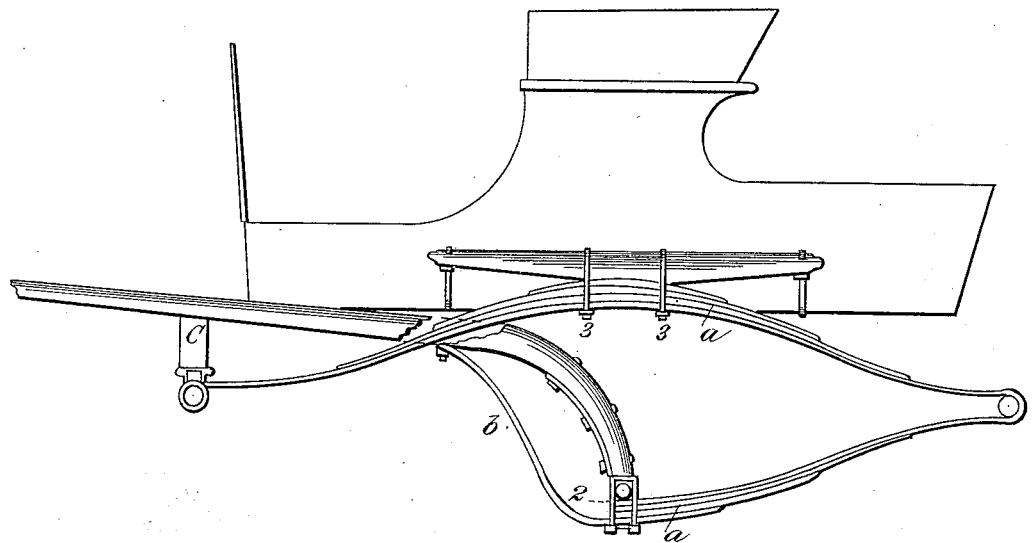
Witnesses:
Samuel Haley
Inventor

UNITED STATES PATENT OFFICE.

SAMUEL HALEY, OF MOLINE, ILLINOIS.

TWO-WHEELED VEHICLE.

SPECIFICATION forming part of Letters Patent No. 263,511, dated August 29, 1882.

Application filed May 4, 1882. (No model.)

*To all whom it may concern:*

Be it known that I, SAMUEL HALEY, a citizen of the United States, residing at Moline, in the county of Rock Island and State of Illinois, have invented certain new and useful Improvements in Two-Wheel Vehicles; and I do hereby declare the following to be a full, clear, and exact description of the invention, such as will enable others skilled in the art to which it appertains to make and use the same, reference being had to the accompanying drawing, and to the letters or figures of reference marked thereon, which form a part of this specification.

My invention relates to that class of two-wheeled pleasure-vehicles where springs are used to support the body or seat; and the objects of my improvements are to provide a safe, free, and elastic movement of the seating portion of a vehicle when in motion. I attain these objects by the use of what are known as the "three-quarter elliptic springs," "cross-bar spring," and " braces," illustrated in the accompanying drawing, in which the figure is a sectional view of a two-wheel vehicle as it appears with the springs and braces attached thereto.

Similar letters and figures refer to similar parts.

The elliptic springs $a\ a$ are firmly attached to the axle 2 2 at each side, the lower leaf extending forward and forming braces $b\ b$, which are attached to the under side of the shafts. By this manner of brace the springs $a\ a$ can be more firmly and securely attached to the axle and a more substantial support given to the shafts. The upper part of springs $a\ a$ is carried forward and connected with a cross-bar reverse-spring, $c$, which is securely attached to the under side of the cross-beam or draft-bar of the shafts. The springs $a\ a$ and $c$, being attached to the axle and shafts, as described, form the support for the body or seat of the vehicle, which may be placed at or nearly on a line over the axle, as shown.

I am aware that prior to my invention elliptic springs and other springs have been made and used on vehicles. I therefore do not claim a combination, broadly; but What I do claim, and desire to secure by Letters Patent, is—

The combination of three-quarter elliptic springs $a\ a$, spring $c$, and braces $b\ b$ with a two-wheel vehicle, substantially as specified and set forth.

In testimony whereof I affix my signature in presence of two witnesses.

SAMUEL HALEY.

Witnesses:
W. J. ENTRIKIN,
AMOS K. CAVERLY.